(12) United States Patent
Grimm et al.

(10) Patent No.: US 12,362,621 B2
(45) Date of Patent: Jul. 15, 2025

(54) STATOR OF AN ELECTRIC MOTOR, AND ELECTRIC MOTOR

(71) Applicant: Brose Fahrzeugteile SE & Co. Kommanditgesellschaft, Würzburg, Würzburg (DE)

(72) Inventors: Marco Grimm, Unterschleissheim (DE); Stefan Wüst, Lohr am Main (DE); Alexander May, Zellingen (DE); Daniel Hirsch, Höchberg (DE); Oliver Haupt, Würzburg (DE); Dominik Fenten, Güntersleben (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 215 days.

(21) Appl. No.: 17/947,232

(22) Filed: Sep. 19, 2022

(65) Prior Publication Data
US 2023/0013487 A1 Jan. 19, 2023

Related U.S. Application Data (63) Continuation of application No. PCT/EP2021/056444, filed on Mar. 15, 2021.

(30) Foreign Application Priority Data

Mar. 17, 2020 (DE) ...................... 10 2020 203 416.8

(51) Int. Cl.
*H02K 3/52* (2006.01)
*B62D 5/04* (2006.01)

(52) U.S. Cl.
CPC .............. *H02K 3/522* (2013.01); *B62D 5/04* (2013.01); *H02K 2203/12* (2013.01)

(58) Field of Classification Search
CPC ...... H02K 3/522; H02K 2203/12; H02K 3/32; H02K 3/325; H02K 5/24
(Continued)

(56) References Cited

U.S. PATENT DOCUMENTS 6,369,483 B1 * 4/2002 Hill ..................... H02K 15/095
310/429
6,700,283 B2 3/2004 Kikuchi et al.
(Continued)

FOREIGN PATENT DOCUMENTS

DE 60117084 T2 7/2006
DE 102012214567 A1 * 2/2014 ............. H02K 1/148
(Continued)

OTHER PUBLICATIONS

Machine Translation of DE-102012214567-A1, Helmi, (Year: 2014).*

*Primary Examiner* — Terrance L Kenerly
*Assistant Examiner* — Theodore L Perkins
(74) *Attorney, Agent, or Firm* — Laurence A. Greenberg; Werner H. Stemer; Ralph E. Locher (57) ABSTRACT

A stator of an electric motor has a number of radially directed stator teeth, onto each of which an insulating coil carrier for a coil of a multiphase rotating field winding is or can be placed. The stator teeth are connected to one another on the outer circumference on a yoke side, forming stator grooves. On the inner circumference, on a pole shoe side, a groove gap is respectively formed between adjacent stator teeth. Stiffening is provided on the inner circumference on the pole shoe side of the stator teeth, in the form of a stiffening element that projects into the or each groove gap.

10 Claims, 5 Drawing Sheets

(58) Field of Classification Search
USPC .................................................. 310/216.105
See application file for complete search history.

(56) References Cited

U.S. PATENT DOCUMENTS

| | | | |
|---|---|---|---|
| 6,870,292 | B2 | 3/2005 | Owada et al. |
| 9,601,961 | B2 | 3/2017 | Lee et al. |
| 11,133,723 | B2 | 9/2021 | Hirsch et al. |
| 2004/0189136 | A1 | 9/2004 | Kolomeitsev et al. |
| 2011/0037338 | A1* | 2/2011 | Leiber .................. H02K 15/022 |
| | | | 310/216.105 |
| 2011/0304238 | A1 | 12/2011 | Nagai et al. |
| 2013/0221770 | A1* | 8/2013 | Yokogawa ............. H02K 3/345 |
| | | | 310/43 |
| 2013/0328418 | A1* | 12/2013 | Ewert ...................... H02K 3/32 |
| | | | 310/43 |
| 2016/0241090 | A1* | 8/2016 | Nakagawa ............. H02K 3/522 |
| 2017/0110916 | A1* | 4/2017 | Matsumoto ............ H02K 1/146 |

FOREIGN PATENT DOCUMENTS

| | | |
|---|---|---|
| DE | 102016215661 A1 | 3/2017 |
| DE | 102018200598 A1 | 7/2019 |
| EP | 2700147 B1 | 6/2018 |
| EP | 3460958 A1 | 3/2019 |
| EP | 3512077 A1 | 7/2019 |
| JP | 2003088011 A | 3/2003 |
| JP | 2003164088 A | 6/2003 |
| JP | 2003319576 A | 11/2003 |
| JP | 2004088944 A | 3/2004 |
| WO | 9512912 A1 | 5/1995 |
| WO | 2019052783 A1 | 3/2019 |
| WO | 2019181523 A1 | 9/2019 |

* cited by examiner

STATOR OF AN ELECTRIC MOTOR, AND ELECTRIC MOTOR

CROSS-REFERENCE TO RELATED APPLICATION

This application is a continuation, under 35 U.S.C. § 120, of copending International Patent Application PCT/EP2021/056444, filed Mar. 15, 2021, which designated the United States; this application also claims the priority, under 35 U.S.C. § 119, of German Patent Application DE 10 2020 203 416.8, filed Mar. 17, 2020; the prior applications are herewith incorporated by reference in their entirety.

FIELD AND BACKGROUND OF THE INVENTION

The invention relates to a stator of an electric motor, in particular for a steering drive of a motor vehicle. The stator has a number of radially directed stator teeth onto each of which an insulating coil carrier for a coil of a multiphase rotating field winding is placed. The invention further relates to an electric motor having such a stator.

A stator of this type is used in particular in a brushless electric motor (brushless DC motor, BLDC motor), in which wear-prone brush elements of a rigid (mechanical) commutator are replaced by an electronic commutation of the motor current. Such an electric motor, for example in an electric-motor power steering system (EPS: Electric Power Steering, EPA: Electric Power Assisted Steering) of a motor vehicle, assists the manual steering movements of the motor vehicle user with an electric-motor-generated auxiliary force.

The (stationary) stator used in the electric motor as a (three-phase) machine in principle has stator laminations comprising a number, i.e., plurality, of stator teeth arranged in the form of a star. The stator teeth carry an electric rotating field winding in the form of individual (stator) coils or coil windings (phase windings), which in turn are wound from an insulating wire (coil wire). The phase windings are assigned with their coil or phase ends to individual, usually three, (motor) phases and wired to one another in a predetermined manner.

The typically three phases (phase windings) each have electric current applied with a phase offset in order to generate a magnetic rotating field, in which a rotor usually provided with permanent magnets rotates. The phase ends of the phase windings are led to motor electronics via phase connections in order to control the electric motor. The coils of the rotating field winding are wired to one another in a specific way by way of their coil ends. The manner in which the coil ends are wired is determined by the winding scheme or the winding structure of the rotating field winding, with a star connection, a delta connection or a combination thereof being usual as winding scheme.

Stators for steering drives are generally mounted or suspended in an engine compartment in the region of their outer circumference. It is desirable for the stator and therefore the electric motor to be constructed in as space-saving and low-weight a manner as possible and to produce as little noise as possible during operation. Here, the stator can be formed with a cylindrical stator yoke embracing the stator teeth and with decoupling rings arranged at the ends, in order to suppress the development of noise.

The stator yoke and the stator teeth of the stator can, for example, be formed in one piece or as one part or else in many pieces or from many parts. In one possible embodiment, the stator has, for example, stator laminations with the stator yoke as a cylindrical outer stator component and with a separate stator star as a star-shaped inner stator component with a number of stator teeth directed radially outward. The stator yoke and the stator star are pressed together, for example in a force-fitting or frictionally fitting manner, when the stator is being joined or assembled. Likewise conceivable, for example, is a non-segmented configuration of the stator yoke and of the stator teeth (solid stator) or else a segmented configuration of the stator yoke and the stator teeth as a pole or curb chain.

A stator of an electric motor known from commonly assigned German published patent application DE 10 2017 202 546 A1, in particular of a steering motor of a motor vehicle, comprises a stator yoke with a number of stator teeth arranged in the form of a star and directed radially inward, which are provided with coils of a multi-phase rotating field winding. The coils can each be arranged on a stator tooth as individual coils or attached to two or more stator teeth as double or multiple coils. On the yoke side, the stator teeth are connected to one another on the outer diameter (outer periphery) of the stator, forming a magnetic return path, while the radially inner-side pole shoe is open for electromagnetic flux reasons. For this purpose, the free ends of the stator teeth are spaced apart from one another on the rotor-side internal diameter (inner circumference) of the stator, forming a gap for the purpose of avoiding a magnetic short circuit. The coils are wound onto an insulating coil carrier (winding former or winding carrier), and the wound coil carriers are placed on the stator teeth. In the assembled state, the coil ends are wired to the (motor) phases, for example by means of a contact-making device that can be placed at the ends.

In the course of the electromagnetic excitation of the stator, necessitated by operation, and because of the required gap formation at the free ends of the stator teeth and thus their lack of connection to the inner circumference of the stator, the radial stiffness thereof is low and, consequently, the radial deformation thereof is particularly high. In particular, a stator having twelve stator teeth and twelve stator grooves and, for example, five magnetic poles, deforms particularly highly because of the opposite magnetic forces caused thereby. This deformation is usually transmitted to the motor housing of the electric motor surrounding the stator. This in turn leads to a high acoustic level—in the afore-mentioned example with twelve stator grooves on the stator side and five magnetic poles in the 10th motor order—and thus to an undesirable generation of noise during motor operation.

SUMMARY OF THE INVENTION

It is accordingly an object of the invention to provide a stator for an electric motor which overcomes a variety of disadvantages of the heretofore-known devices and methods of this general type and which provides for a particularly suitable stator for an electric motor that achieves an improved acoustic behavior during electric-motor operation. Furthermore, the intention is to specify an electric motor provided with such a stator with the greatest possible reduction in the development of noise.

With the above and other objects in view there is provided, in accordance with the invention, a stator of an electric motor, the stator comprising:

a plurality of radially directed stator teeth, the stator teeth having a yoke side on an outer circumference and a pole shoe side on an inner circumference of the stator;

an insulating coil carrier for a coil of a multiphase rotating field winding placed or to be placed on each of the plurality of stator teeth;

the stator teeth being connected to one another on the outer circumference, forming stator grooves;

mutually adjacent stator teeth having a groove gap formed therebetween on the pole shoe side; and a stiffening element projecting into each groove gap on the pole shoe side of the stator teeth.

In other words, the stator has a number of radially directed stator teeth with coil carriers (winding formers or winding carriers) that are or can be placed thereon for coils of a multi-phase rotating field winding. The stator teeth are connected to one another on the outer circumference (stator external diameter) on the yoke side, forming stator grooves. On the inner circumference on the pole shoe side (stator internal diameter), on which a groove gap is respectively formed between adjacent stator teeth, stiffening in the form of a stiffening element guided into the or each groove gap is provided. The stator is suitable and provided in particular for an electric motor as steering drive of a motor vehicle.

The coil carrier preferably has flanged collars at the ends, i.e., directed at right angles to the tooth longitudinal direction, between which the existing winding space is delimited. The respective coil carrier produced from an insulating material, in particular from a plastic material, is preferably made in two parts. Expediently, the coil carrier has two half-shell-like coil carrier parts with coil carrier sections extending axially and flanking the respective stator tooth on both sides. In other words, the coil carrier parts are approximately U-shaped, with the U legs forming the coil carrier sections, which receive an axial section of the respective stator tooth between them.

In a suitable way, the respective stator tooth is populated with the coil carrier, in particular with the two coil carrier parts, and wound with the respective coil. Then, the stator teeth wound in this way are connected to one another on the yoke side. In other words, first of all the coil carriers are placed on the stator teeth and these are wound with the respective coil as individual segments.

The invention is based on the fact that an improved acoustic behavior can be achieved during electric motor operation if a sufficient radial stiffness of the stator is also produced in the region of the free ends of the stator teeth on the pole shoe side. As has been recognized, this can be achieved by the groove gaps between the free ends of the stator teeth on the pole shoe side being filled, for example also by plastic overmolding of the stator, which extends into the groove gaps and thus produces a connection to the inner circumference of the stator.

The stiffening of the stator on its inner circumference on the pole shoe side (stator internal diameter) is expediently carried out by the coil carriers within the respective stator groove touching one another in the region of the respective groove gap on the pole shoe side. For this purpose, provision is suitably made for a stiffening element to be seated in the groove gap formed on the inner circumference on the pole shoe side between adjacent stator teeth. This is preferably achieved by the coil carrier having a coil carrier extension as stiffening element guided into the groove gap.

Particularly preferably, on only one of the two coil carrier sections of the respective coil carrier part, the coil carrier extension leading into the groove gap on the pole shoe side is molded on as stiffening element. As a result, the coil carrier parts can advantageously be made (provided) as identical parts. Two axially offset coil carrier extensions of the coil carrier parts of adjacent stator teeth are suitably guided into the groove gap. In other words, the two preferably identical coil carrier parts rotated by 180° relative to each other are placed on the stator tooth from different axial directions and thus together form the stator carrier of the respective stator tooth.

In an advantageous refinement, the stiffening of the stator on its inner circumference on the pole shoe side (stator internal diameter) is thus achieved by the coil carriers being developed in such a way that at least one of the coil carriers which extends (radially) as far as the groove gap within the stator groove has an extension guided into the groove gap, which serves as stiffening element in the groove gap. The stiffening elements inserted into individual, into multiple or into all the groove gaps present and preferably molded onto the coil carriers thus particularly advantageously form the stiffening of the stator, so that the latter has a particularly high (large) radial stiffness.

To avoid a magnetic short circuit, the stiffening element consists of a magnetically nonconductive material, in particular of a plastic material. The stiffening element is preferably clamped in the groove gap between the stator teeth flanking the latter and forming the respective stator groove.

According to a particularly preferred development, the coil carriers within the stator groove have corresponding contact contours in the region of the groove gap. The contact contours are suitably configured and/or dimensioned in such a way that these contact contours of the coil carriers or the contact surfaces provided for this purpose or formed thereby overlap, at least in some regions. The contact contours or their contact surfaces can extend radially rectilinearly for this purpose. Alternatively, a tongue and groove contour is provided, which, in the coil carriers, in the region of the groove gap, is preferably introduced radially directly adjoining the latter within the stator groove, on the one hand as a groove and on the other hand as a pin or cam engaging in the latter as a tongue. This contour can, for example, also be dovetail-like.

The electric motor according to the invention is in particular suitable and set up for use in a steering drive of a motor vehicle. The electric motor has a motor housing like a pole pot, in which a stator stiffened on the pole shoe side and a rotor rotatably mounted relative to the latter are accommodated. The stator has a number of stator teeth extending radially inward in the shape of a star, between which there are formed stator grooves, in which the coils of the stator winding or rotating field winding are accommodated.

Other features which are considered as characteristic for the invention are set forth in the appended claims.

Although the invention is illustrated and described herein as embodied in a stator of an electric motor, and electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Mutually corresponding and equivalent parts are provided with the same designations throughout the figures.

DETAILED DESCRIPTION OF THE INVENTION

Figure 1:
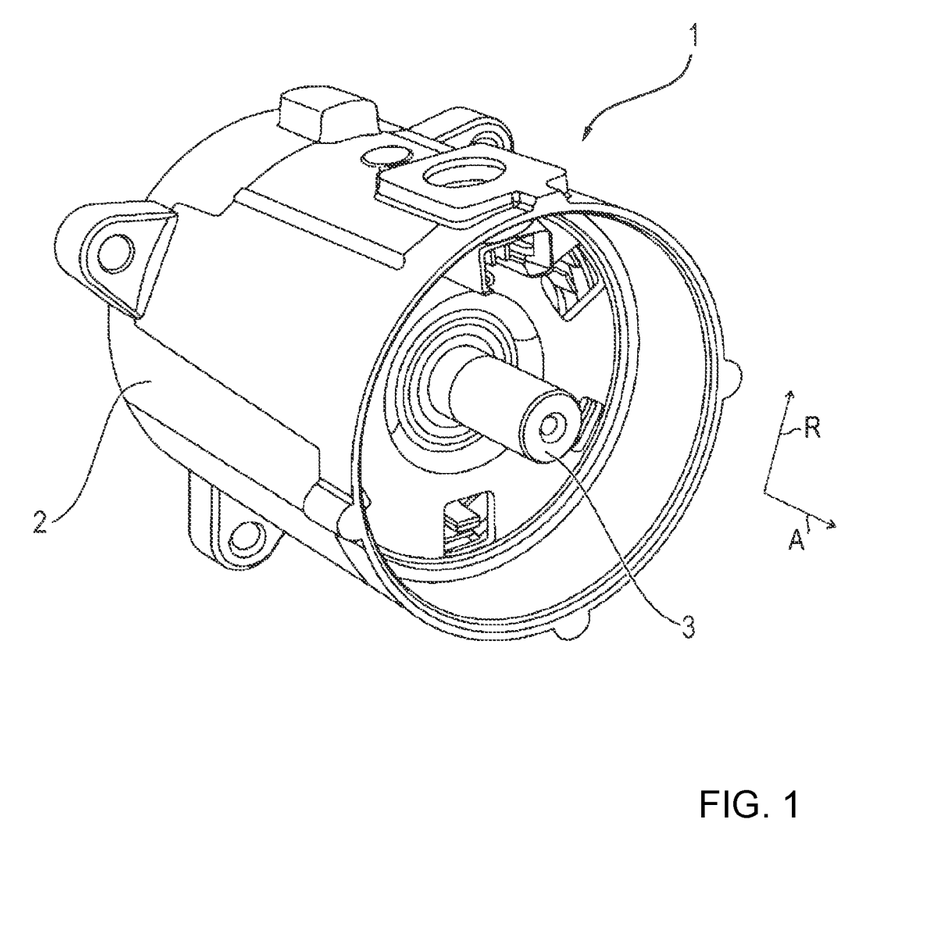
FIG. 1 shows a perspective illustration of an electric motor of a motor vehicle having a pole-pot-like motor housing.

Referring now to the figures of the drawing in detail and first, in particular, to FIG. 1 thereof, there is shown an electric motor 1 of a motor vehicle, in particular for an electric-motor steering drive, having a motor housing 2 like a pole pot. As can be seen, a motor shaft 3 extending in the axial direction A passes through the motor housing 2. On the motor shaft 3, a rotor 4, for example equipped with permanent magnets (FIG. 2), is arranged to be fixed to the shaft and is rotatably mounted in a stator 5 (FIG. 2) of the electric motor 1.

Figure 2:
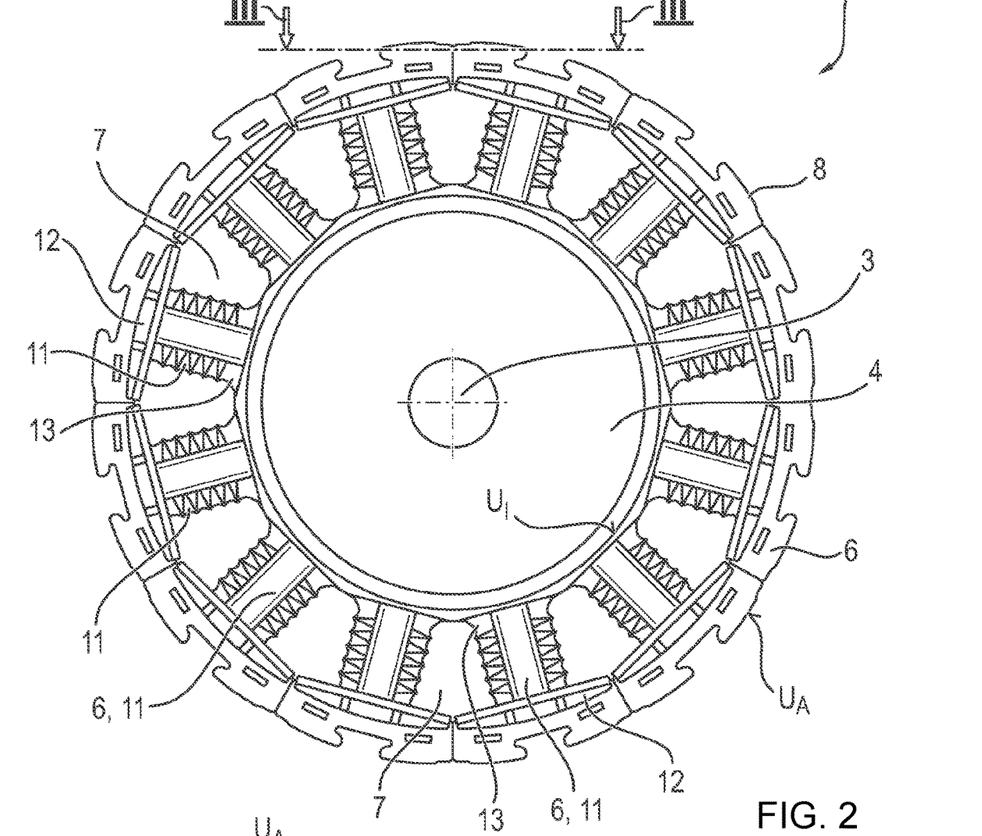
FIG. 2 shows a top view and as a detail of a stator arranged in the motor housing and stiffened on the pole shoe side, having stator grooves between stator teeth with coil carriers put in place.

The stator 5 illustrated in a detail in FIG. 2 and surrounding the rotor 4 has a number of stator teeth 6 which are directed along a radial direction R, i.e. directed radially inward, between which stator grooves 7 are formed. The stator teeth 6 are preferably designed as segmented laminations extending axially (in the axial direction A) and, on their external circumference (external diameter) UA facing the motor housing 2, i.e., radially outside, are connected to one another, for example by means of welding, forming a stator yoke 8. Here, a particularly high filling factor of the coil windings in the stator grooves 7 is advantageously achieved.

In the assembled state, the rotating field windings or coil windings, not visible in FIG. 2, are laid around the stator teeth 6 of the stator 5. The windings are wound as coils on insulating coil or winding carriers 11, which are placed on the stator teeth 6. When assembled, each of the coil carriers 11 here carries an (individual) coil or coil winding as part of the stator winding or rotating field winding. The segmented stator tooth 6 with the coil carrier 11 placed thereon forms a pole segment of the stator 5. The coil carriers or winding carriers 11 are placed on the stator teeth 6 in a suitable way and the coil windings are then attached. The stator teeth 6 wound in this way are then connected to one another on the yoke side, forming the stator 5.

The respective coil carrier 11 has a flange collar 12 on the yoke side and a flange collar 13 on the pole shoe side. As can be seen, the flange collars 13 of the coil carriers 11 on the pole shoe side touch in the region of the pole shoe 14 of the stator 5. In this way, stiffening of the stator 5 on the pole shoe side is achieved. Because of the stiffening of the stator 5 on its inner circumference (internal diameter) UI (on the pole shoe side), the radial stiffness of the stator 5 is increased and, as a result, the acoustic level of the thus particularly low-noise electric motor 1 is improved.

Figure 3A:
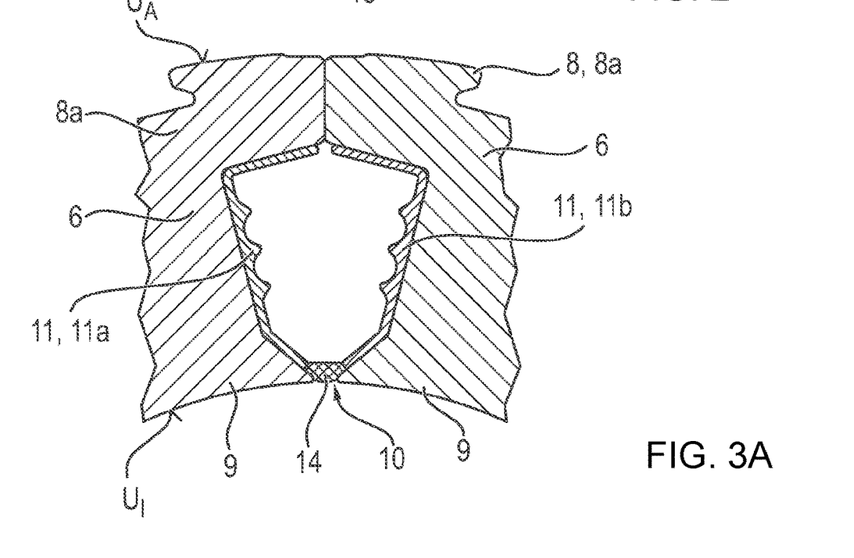
FIG. 3A shows a detail in a sectional illustration along the line III-Ill in FIG. 1 of a stator groove between adjacent stator teeth with a groove gap on the pole shoe side and the stiffening element introduced therein as a stiffening of the stator on its inner circumference on the pole shoe side.
Figure 3B:
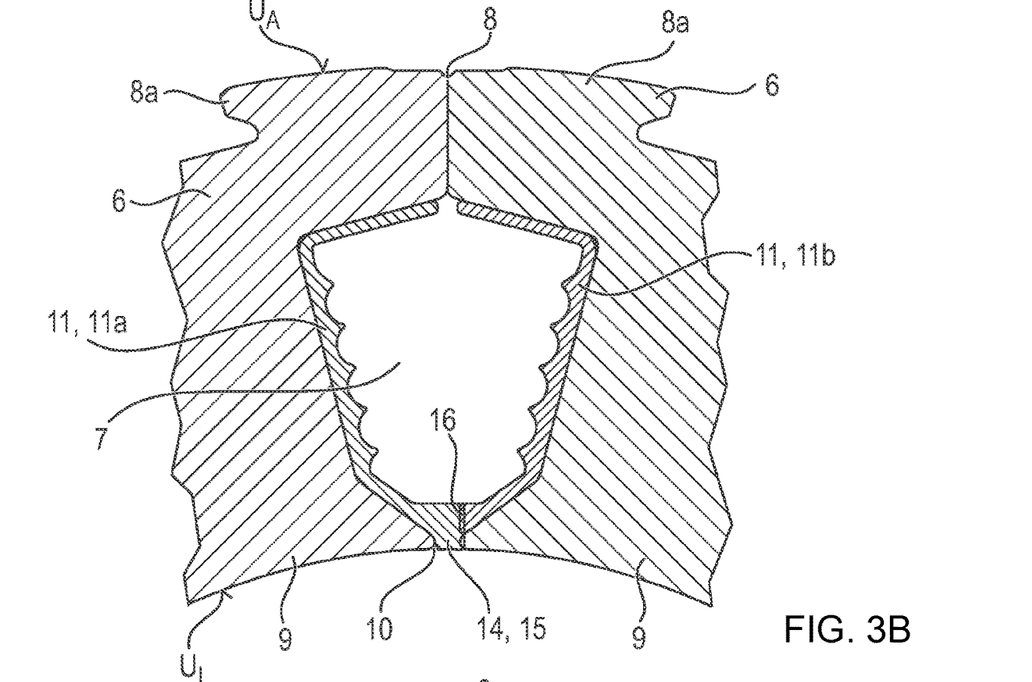
FIG. 3B shows, in a detail according to FIG. 3A, a coil carrier extension led further into the groove gap on the pole shoe side as a stiffening element with a partial overlap of sections of the coil carriers of adjacent stator teeth.
Figure 3C:
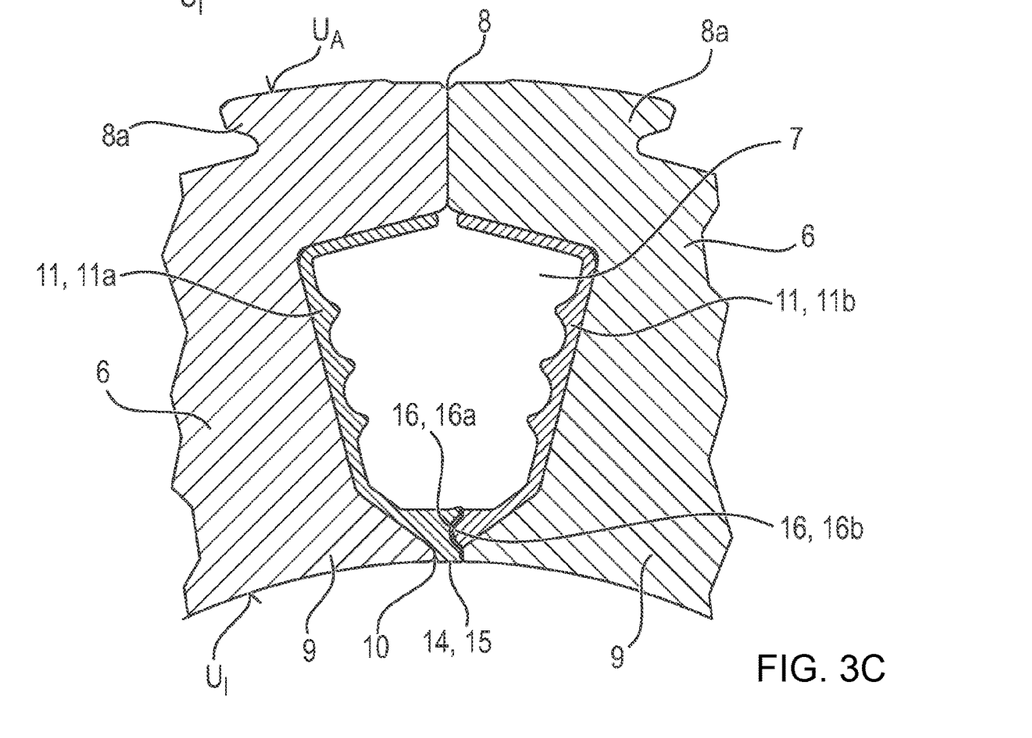
FIG. 3C shows, in an illustration according to FIG. 3B, a tongue and groove contour of the coil carrier sections as an overlap in the region of the groove gap on the pole shoe side.

From FIGS. 3A to 3C, it can be seen comparatively clearly that the stator 5 is open on its inner circumference (internal diameter) UI on the pole shoe side. In the interests of the electromagnetic flux, a groove gap 10 is in each case formed in the respective stator groove 7 between the stator teeth 6, in the region of the radially inner tooth free ends 9.

In the embodiment shown in FIG. 3A, a stiffening element 14 is inserted into the groove gap 10. It is possible to see the stator groove 7 between two adjacent stator teeth 6, shown as details, with respective coil carriers 11 arranged thereon, of which only their coil carrier sections 11a seated within this stator groove 11 on one side and 11b on the other side are shown. In other words, of the coil carrier 11 on the left in FIG. 3A, its coil carrier section designated 11a and, of the coil carrier 11 on the right in FIG. 3A, its coil carrier section designated 11b, are located within this stator groove 7. These coil carrier sections 11a, 11b are brought radially up to the stiffening element 14 and rest on the latter.

Analogously, corresponding stiffening elements 14 can be inserted into all further groove gaps 10 on the pole shoe side of the stator 5. In order to avoid an electromagnetic short circuit, the additional material formed by the respective stiffening element 14 is chosen from a magnetically non-conductive material, for example plastic. The stiffening element 14 is clamped in the respective groove gap 10 between the stator teeth 6 flanking the latter and forming the respective stator groove 7.

In the embodiments shown in FIGS. 3B and 3C, the stiffening of the stator 5 on its inner circumference (stator internal diameter) UI on the pole shoe side is produced by means of the coil carriers 11. For this purpose, a coil carrier extension 15 of one of the two coil carriers 11 extends radially within the respective stator groove 7 into the groove gap 10 there. This coil carrier extension 15 extending into the groove gap 10 thus forms the stiffening element 14. The stiffening elements 14 inserted into the groove gaps 10 effectively form the stiffening of the stator 5 and thus improve the radial stiffness of the latter to a great extent. For this purpose, the coil carriers 11 have corresponding contact contours 16 within the stator groove 7 in the region of the groove gap 10 or contact surfaces provided thereby. The contact contours 16 are configured in such a way that they overlap, preferably axially, for example only in some regions.

In the embodiment according to FIG. 3B, the contact contours 16 extend rectilinearly. This embodiment can be produced particularly simply and cost-effectively.

In the embodiment according to FIG. 3C, the contact contours 16 form a tongue and groove contour. These are provided within the stator groove 7, adjacent to the groove gap 10. In one of the coil carrier sections, here in the coil carrier section 11a of the coil carrier 11 on the left in FIG. 3C, a groove 16a is introduced and, in the other, here in the coil carrier section 11b of the coil carrier 11 on the right in FIG. 3C, a pin or cam 16b engaging in the groove 16a is molded on as a tongue. This embodiment is distinguished by a particularly high stiffness.

In both embodiments according to FIGS. 3B and 3C, an overlap is provided in order to achieve elastic compression of the coil carrier material. The coil carrier extension 15 guided into the respective groove gap 10 or dipping into the latter as stiffening element 14 is clamped in between the adjacent stator teeth 6. In this way, firstly the particularly effective stiffening of the stator 5 is achieved. Secondly, it is ensured that the coil carriers 11 cannot give way in the direction of the stator winding as a result of the forces during compression. As a result of the compression of the material, a preload is established in the system, so that compressive forces can be transmitted.

Figure 4:
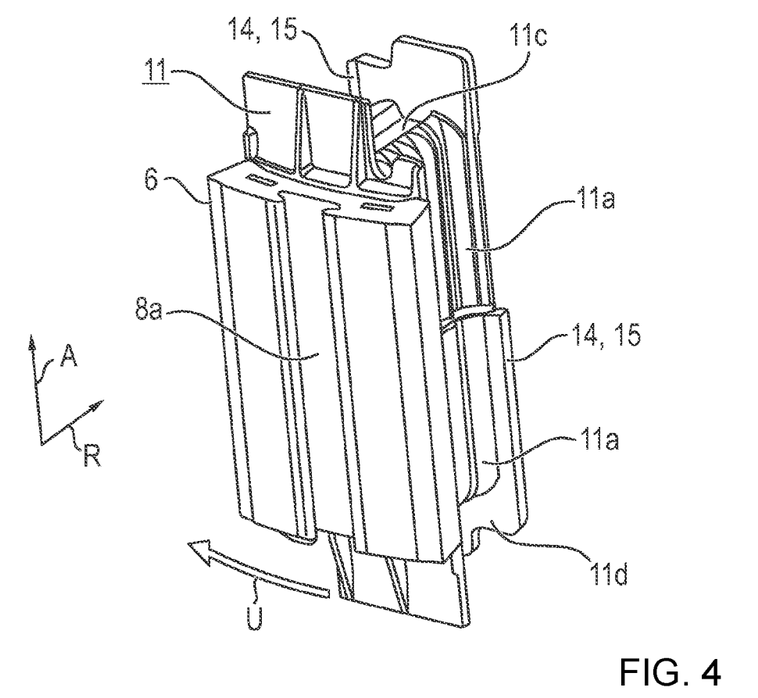
FIG. 4 shows, in a perspective illustration, a coil carrier made of identical half shells as coil carrier parts with a stiffening element on the pole shoe side on different sides of the stator tooth in the circumferential direction of the stator, with a view of its yoke section (tooth end on the yoke side)
Figure 5:
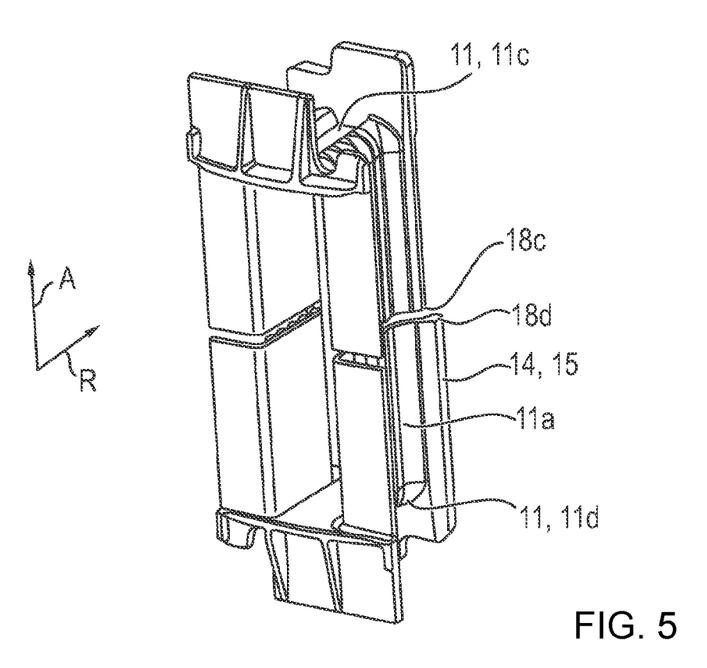
FIG. 5 shows, in a perspective illustration, the two-part (two-shell) carrier according to FIG. 4 with section free ends of their coil carrier sections facing each other.
Figure 6:
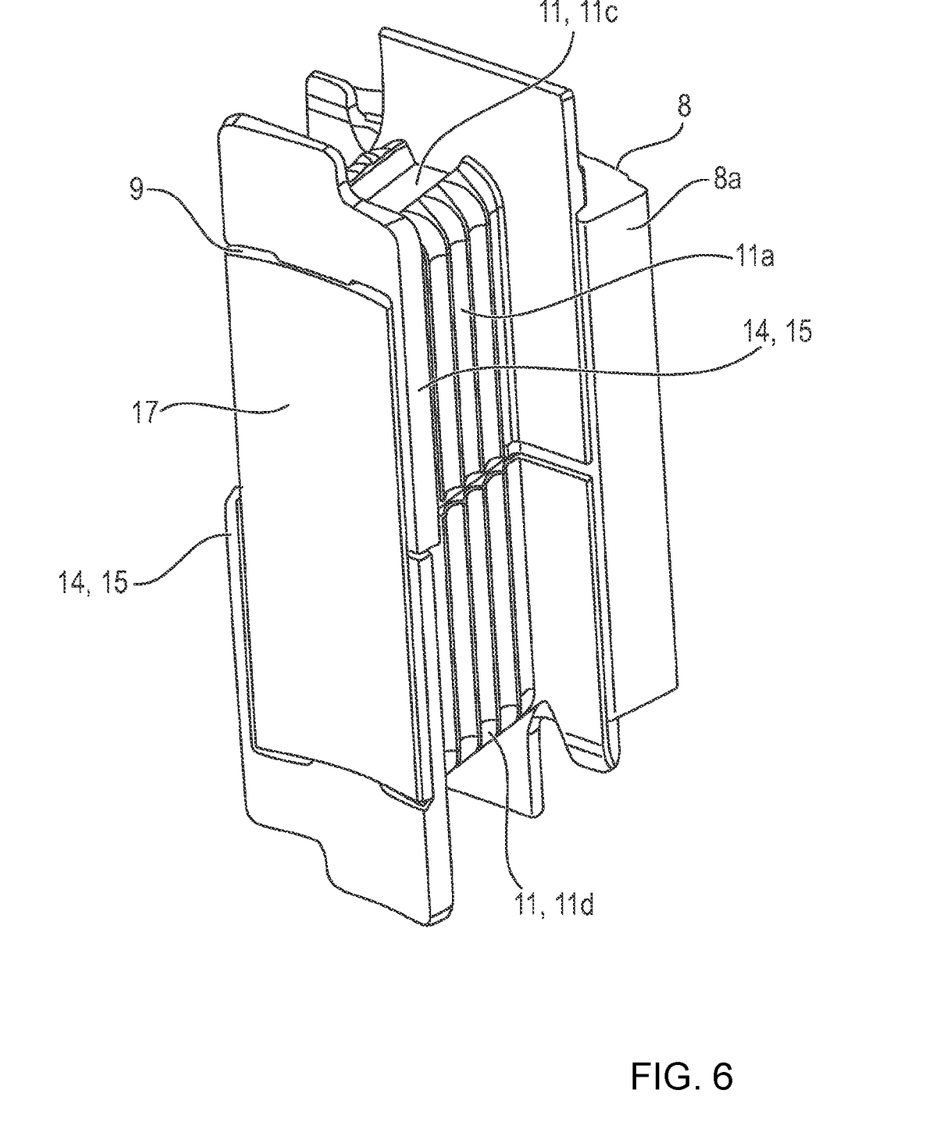
FIG. 6 shows, in an illustration according to FIG. 4, the two-part (two-shell), carrier with identical coil carrier parts, with a view of the pole shoe (tooth end on the pole shoe side) of the stator tooth.

FIGS. 4 to 6 show, in a perspective illustration, the coil carrier 11 made of two identical half shells as coil carrier parts 11c, 11d with a coil carrier extension 15 on the pole shoe side as stiffening element 14 on different sides of the stator tooth 6 in the circumferential direction U of the stator 5, with a view of a yoke section 8a of the stator yoke 8 (FIG. 4) and, respectively, with a view of the pole shoe 17 of the stator tooth 6 at the tooth free end 9 (FIG. 6).

As can be seen, the coil carrier extension 15 on the pole shoe side of the lower coil carrier part 11d in FIGS. 4 to 6 extends in the axial direction A over approximately or exactly the lower half of the stator tooth 6. The coil carrier extension 15, on the pole shoe side, of the upper coil carrier part 11c extends on the side of the stator tooth 6 that is located opposite, is hidden in FIGS. 4 and 5 and visible in FIG. 6, over approximately or exactly its upper half.

As can be seen comparatively clearly in FIG. 5, only one of the two coil carrier sections 11a of the respective coil carrier part 11c, 11d of the coil carrier extension 15 is molded as stiffening element 14 to be guided into the groove gap 10 on the pole shoe side. The coil carrier parts 11c, 11d formed as identical parts are arranged to be rotated by 180° relative to each other, so that the section free ends 18c, 18d of the coil carrier sections 11a of the U-shaped coil carrier parts 11c and 11d face each other.

When the stator teeth 6 with coil carriers 11 in place are joined, two axially offset coil carrier extensions 15 of the coil carrier parts 11c, 11d of respectively adjacent stator teeth 6 are thus guided into the groove gap 10 on the pole shoe side. The respective coil carrier extension 15 rests on that coil carrier section 11b of the coil carrier 11 of the adjacent stator tooth 6, which coil carrier section 11b has no coil carrier extension 15. The coil carriers 11 of adjacent stator teeth 6 are thus joined in the manner of steps or combs within the groove gap 10, and therefore rest on one another with their contact contours (contact surfaces) 16 offset in the manner of steps in the axial direction A and are preferably pressed against one another. In other words, the coil carriers 11 in the area of their coil carrier extensions 15 on the groove gap side are pressed with each other in the course of the joining of the stator teeth 6, forming the stator 5.

In summary, the invention relates to a stator 5 of an electric motor 1, in particular as steering drive of a motor vehicle, having a plurality of radially directed stator teeth 6, on each of which an insulating coil carrier 11 for a coil of a multi-phase rotating field winding is placed, wherein the stator teeth 6 are connected to one another on the outer circumference UA on the yoke side, forming stator grooves 7 and wherein stiffening is provided on the inner circumference UI, on the pole shoe side, of the stator teeth 6. A stiffening element 14, which is formed by a coil carrier extension 15, is guided into the or each groove gap 10 in a suitable way It will be understood that the claimed invention is not restricted to the above-described exemplary embodiments. Instead, other variants of the invention can also be derived by those skilled in the art within the context of the disclosed claims without departing from the subject matter of the claimed invention. In particular, all individual features described in conjunction with the various exemplary embodiments within the scope of the disclosed claims can also be combined in any other way without departing from the subject matter of the claimed invention.

In addition, the solution described can be used not only in the specifically illustrated application but also in a similar implementation in other motor vehicle applications such as, for example, in door and tailgate systems, in window lifters, in vehicle locks, in adjustable seat and interior systems and in electric drives, control systems, sensors and their arrangement in the vehicle.

The following is a summary list of reference numerals and the corresponding structure used in the above description of the invention:

1 Electric motor
2 Motor housing
3 Motor shaft
4 Rotor
5 Stator
6 Stator tooth
7 Stator groove
8 Stator yoke
8a Yoke section
9 Tooth free end
10 Groove gap
11 Coil carrier/winding carrier
11a,b Coil carrier section
11c,d Coil carrier part
12 Flange collar on yoke side
13 Flange collar on pole shoe side
14 Stiffening element
15 Coil carrier extension
16 Contact contour/surface
16a Groove
16b Cam/pin/tongue
17 Pole shoe
18c,d Section free end
A Axial direction
R Radial direction
U Circumferential direction
UA Outer circumference/diameter (on yoke side)
UI Inner circumference/diameter (on pole shoe side)

The invention claimed is:
1. A stator of an electric motor, the stator comprising:
a plurality of radially directed stator teeth, said stator teeth having a yoke side on an outer circumference and a pole shoe side on an inner circumference of the stator;
an insulating coil carrier for a coil of a multiphase rotating field winding placed or to be placed on each of said plurality of stator teeth, said coil carrier having two carrier parts;
said stator teeth being connected to one another on the outer circumference, forming stator grooves;
mutually adjacent stator teeth having a groove gap formed therebetween on the pole shoe side;
a stiffening element guided into each groove gap on the pole shoe side of said stator teeth; and two axially offset coil carrier extensions of said carrier parts of adjacent stator teeth projecting into said groove gaps, and said coil carriers of mutually adjacent stator teeth are joined in the manner of steps or combs within the groove gap;

said two carrier parts of said coil carrier being two half-shell-shaped coil carrier parts formed with coil carrier sections extending axially and flanking a respective said stator tooth on both sides thereof;

one of said coil carrier sections of the respective coil carrier part in said stator groove being formed with a coil carrier extension guided into said groove gap as a stiffening element, and said coil carrier extension leading into said groove gap on the pole shoe side being molded on as a stiffening element.

2. The stator according to claim 1, wherein said stiffening element is formed of a magnetically nonconductive material.

3. The stator according to claim 2, wherein said stiffening element is formed of plastic.

4. The stator according to claim 1, wherein said stiffening element is molded onto said coil carrier.

5. The stator according to claim 1, wherein:
said coil carriers within the respective said stator grooves touch one another in a region of said groove gap on the pole shoe side; and/or
said coil carriers within said stator grooves have corresponding contact contours in the region of said groove gap.

6. The stator according to claim 5, wherein:
the contact contours overlap at least one of said coil carriers or said stiffening elements in some regions in the region of said groove gap; and/or
said stiffening element in said groove gap is clamped between adjacent said stator teeth.

7. The stator according to claim 1, wherein said coil carriers have a tongue and groove contour at said groove gap between adjacent said stator teeth.

8. The stator according to claim 1, wherein exactly one of said coil carrier sections is formed with a coil carrier extension.

9. An electric motor, comprising a motor housing and a stator according to claim 1 disposed in said motor housing.

10. The electric motor according to claim 9 configured for a steering drive of a motor vehicle.

* * * * *